3,287,279
PREPARATION OF A FILTERABLE CO-PRECIPITATE OF PLUTONIUM AND URANIUM
Ward L. Lyon, Fremont, Calif., assignor to the United States of America as represented by the United States Atomic Energy Commission
No Drawing. Filed Aug. 11, 1965, Ser. No. 479,019
8 Claims. (Cl. 252—301.1)

The invention described herein was made in the course of, or under, Contract No. AT(04-3)-189, Project Agreement No. 10, with the United States Atomic Energy Commission.

The present invention relates to an improved method in which uranium and plutonium are co-precipitated from aqueous solutions in a rapid settling and readily filterable form and more particularly to the preparation of urania-plutonia fuel elements for nuclear reactors.

Solid urania-plutonia mixtures are of considerable importance in nuclear reactor technology. For example, mixtures of plutonium 239 and uranium 238 are used as fuel-fertile material in the fabrication of fuel elements for nuclear breeder reactor cores. The uranium 238 is converted to plutonium 239 by the capture of neutrons from the fissioning plutonium fuel and subsequent beta decay. The uranium is introduced into the core in the form of fuel elements comprised of a homogeneous ceramic body of plutonia and urania in solid solution wherein the plutonium content of the fuel element is generally less than 20% by weight. Urania-plutonia mixtures, especially such as required for the above-mentioned breeder reactor fuel elements, have been prepared in the past by co-precipitating urania and plutonia from an acidic aqueous solution containing uranium and plutonium. The uranium and plutonium concentrations are adjusted to simultaneously precipitate uranium and plutonium in the desired ratio upon addition of a precipitant, e.g., ammonia which yields a hydrous oxide mixture which is settled and filtered from the solution and is converted by compaction and firing to provide the desired ceramic fuel body.

The preparation of urania-plutonia mixtures having a low, e.g., less than about 40% plutonia content by co-precipitation poses severe problems. The precipitate is colloid-like and tends to remain suspended for a long period of time. Even after settling it is very difficult to filter due to the finely-divided state and inherent nature of the precipitate. Moreover, the filter cake holds water very tenaciously and dries only very slowly. Cumulatively the slowness of the settling, filtering, and drying processes generally used in the procedures for producing the co-precipitate mixtures requires large and expensive capacity to be built into the fuel element processing facilities.

I have now discovered that if uranium and plutonium contents in the aqueous solution are provided or adjusted to about equimolar ratios, the uranium and plutonium are co-precipitated in a form which settles more rapidly and can be readily filtered. Only about one fifth of the total time is required to co-precipitate, filter and dry urania and plutonia mixtures by the present process as contrasted to those used in conventional practice. The filter cake can be dried in air four times as rapidly as the finely-divided prior art precipitates. The mixture of an equimolar uranium plutonium co-precipitate is a very active powder which is theorized to form a solid solution with the uranium dioxide addition on sintering.

It is theorized that the marked difference in behavior of the present plutonium-uranium precipitates of a molar concentration ratio near unity is due to the formation of a distinct equimolar uranium-plutonium compound, promoting coagulation and increased particle size of the precipitate.

For breeding reactor purposes the optimum concentration ratio of uranium to plutonium is about 4:1. It is desirable to provide other ratios over wide ranges of composition for various purposes. The time required to make a mixture of such a composition, or any other composition having a uranium-plutonium ratio other than unity, is greatly shortened since it has been found that the equimolar co-precipitated mixture of uranium and plutonium can be mixed with selected quantities of urania or plutonia to yield the desired ratios. The invention thus provides procedures which eliminate to a remarkable degree these limitations on the output rate in manufacturing urania-plutonia fuel elements and, moreover, a greater flexibility in composition ratios by using the process of the present invention.

Accordingly, a principal object of the present invention is to provide a method for co-precipitating urania-plutonia admixtures to form precipitates which settle rapidly and are readily filtered.

A further object of the present invention is to provide a plutonium-uranium containing precipitate which is readily filtered and easily dried.

A still further object of the present invention is to provide a method for the rapid manufacture of plutonia-urania fuel element bodies providing considerable flexibility in the selection of the urania-plutonia ratio therein.

Other objects and advantages of the present invention will become apparent upon consideration of the following description.

In general the present process for producing urania-plutonia fuel bodies or the like includes the preparation of an aqueous feed solution which to obtain the improved results is adjusted to contain soluble uranium and plutonium salts in a molar concentration ratio near unity. The solutions are produced as by conventional means. Usually the uranium is in the uranyl state and the plutonium in a plutonium IV ionic state in a nitrate solution. Ammonia is added to the solution to simultaneously precipitate an intimate mixture of uranium diuranate and plutonium hydrous oxides in a ratio near unity. The co-precipitate is allowed to settle and is filtered in conventional filter apparatus. The filter coke is washed with several portions of water and is dried. Finally the dried material is reduced in a hydrogen atmosphere at a temperature between about 600 and 900 degrees C. whereupon the uranium and plutonium content is under proper conditions reduced to the urania-plutonia state.

At this point the powdered reduced equimolar urania-plutonia mixture may be incorporated as by mixing with an additional quantity of urania or plutonia as required to adjust the urania-plutonia ratio to a desired value. For example, for the manufacture of breeder reactor fuel elements, the equimolar urania-plutonia composition may be mixed with a quantity of reactor grade urania to adjust the urania-plutonia ratio to about 4:1, i.e., 80% by weight urania to 20% by weight of plutonia which is an optimum ratio for certain breeder reactor applications. However, substantially any ratio of urania to plutonia, at least from 5 to 95 w/o (weight percent) of urania to plutonia fuel mixtures may be prepared by the present process. Thereafter the mixture is ready for pelletizing in the conventional manner of ceramic body manufacture. Alternatively the mixture may be densified and subsequently swaged or vibratorily compacted.

The first step of the present process is the preparation of a feed solution containing the uranium and plutonium by the mixture of a plutonium solution and uranium solution prepared by the dissolution of crystalline uranyl nitrate in water. Preferred salts for the solution are uranyl nitrate and plutonium nitrate, whereby the uranium may be any desired ratio of specific uranium isotopes in the fuel mixture. The solvent is preferably nitric acid having a concentration between about 1 to 4 molar. The concentration of the uranium and plutonium salts may vary considerably but a practical combined concentration in the range of about 80 to 200 and optimally of about 100 grams per liter. The essential feature of the present invention is that the uranium and plutonium be present in a molar concentration ratio of approximately unity, in order to assure the formation of a rapidly settling and readily filterable precipitate as mentioned above.

The feed solution is continuously stirred and maintained at ambient to moderate temperature, and the uranium and plutonium is co-precipitated from the feed solution by slowly adding ammonium hydroxide until a pH of about 9 is reached. The flocculent precipitate settles readily and is then filtered. The precipitate is collected quantitatively on a filter paper, glass or metal frit, and the procedure is accomplished in generally less than one half the time required for the filtration of plutonium-uranium co-precipitates of U-Pu ratios other than near unity, e.g., a mixture containing less than 30 w/o of plutonium, 70 w/o uranium or 30 w/o uranium 70 w/o plutonia. Significant improvements are obtained within the range of 45 w/o:55 w/o of either plutonia or urania predominating. Typically, the filtration of a 5 l. batch requires only about 1 hour.

The precipitate is then washed with water and acetone and dried. The drying step can be carried out in air and has been found to require only about one-fourth of the time normally required for the drying of conventional precipitates.

The dried precipitates are reduced in a hydrogen-helium atmosphere at a temperature of 600°–900° C. for producing an easily sinterable powdered material. If a composition of lower plutonium content is desired, the urania and plutonia mixture is diluted in the next step by mixing with an amount of finely-divided urania as is necessary in order to obtain the desired proportional plutonium content of the final mixture. The urania utilized for a mixture should be ceramic grade and of the proper isotopic composition to attain the desired final isotopic composition from the standpoint of the neutronics of the reactor fuel.

The dried material or diluted admixture is blended and ball milled to improve dispersion and is sieved through 325 mesh screen. Subsequently the mixture compacted under high pressure and sintered for pellet fabrication. Alternatively, the powdered material may also be processed by densification followed by loading into tubes and swaging. The processes of swaging and pellet fabrication are well known in the art and are described in detail in the USAEC Report GEAP 3486, Parts I and II Fast Oxide Breeder Project I, Fuel Fabrication, Jesse M. Cleveland et al.

Further details of the process of the present invention are given in the following illustrative example.

*Example*

For the fabrication of a fuel element material having the desired composition of 13% plutonium oxide and 87% uranium oxide, a solution of plutonium and uranium in equal concentration and equivalent to 500 grams of combined plutonium oxide and uranium oxide were dissolved in nitric acid. The plutonium and uranium was then precipitated by the addition of ammonium hydroxide until a pH of 9 was established. Subsequently the precipitate was filtered, washed, and dried. After drying the material was reduced in hydrogen at 750° C. The reduced powder was then mixed with 1420 grams of ceramic grade uranium oxide and blended by ball milling, resulting in a total quantity of 1920 grams of a mixture of 13% by weight plutonium oxide and 87% by weight of uranium oxide. The batch was then further processed and fabricated into pellets. The entire operation requires a period of about 48 hours in total. Thus the fuel mixture was produced at a rate of 960 grams per day based on a continuous process. If the fuel material were processed by the conventional one step process, based on the same feed solutions and identical facilities, the time requirement would be at least 2 days for precipitation, filtration, washing and drying steps and in addition another 24-hour period for reduction and ball milling. Thus to produce an equal amount of the 13% plutonium oxide, 87% uranium oxide mixture in facilities having the same capacity, it is necessary to process four batches requiring a total time period of at least 10 days. Hence, the rate of production is only 192 grams per day.

It is readily seen that the output of any facility can be increased by a factor of 5 if the present co-precipitation and blending process is employed.

Whereas the above example and description dealt specifically with the fabrication of fast breeder reactor fuel elements, it must be emphasized that the present process is applicable with the same advantage to the manufacture of urania-plutonia mixtures generally. In particular, the present process may be employed in the preparation of mixed oxide powders for incremental loading with high density uranium oxide by vibratory compaction; for the preparation of mixed plutonia-urania powders for blending with ceramic grade urania in the manufacture of thermal or fast pelletized reactor fuels and in the preparation of mixed oxide feed materials for densification. Accordingly it is intended to limit the invention only by the scope of the appended claims.

What is claimed is:

1. In a process for producing a homogeneous plutonium-oxide-uranium oxide fuel composition the steps comprising producing an acidic feed solution containing plutonium and uranium in a mole concentration ratio between about 0.7 and 1.5, co-precipitating said plutonium and uranium as a hydrous oxide mixture from said feed solution by increasing the alkalinity thereof, filtering, washing and drying said precipitate to produce a homogeneous plutonia-urania admixed fissile material for fuel element fabrication.

2. The process of claim 1 wherein said mole concentration ratio of said plutonium and uranium is about unity.

3. The process of claim 1 wherein said feed solution is a solution of uranyl nitrate and plutonium nitrate.

4. The process of claim 1 wherein said plutonium and uranium are precipitated from said feed solution by the addition of concentrated ammonium hydroxide.

5. In a process for producing a nuclear fuel material for fuel pellet fabrication the steps comprising, producing an acidic feed solution containing said plutonium and uranium in soluble form as a dissolved salt, co-precipitating said uranium and plutonium from said solution by the addition of an alkaline hydroxide, filtering, washing and drying said precipitate, reducing said dried precipitate to produce a composite powder containing plutonium oxide and uranium oxide by heating said dried precipitate in a flowing hydrogen atmosphere to a temperature of about 700° C., and mixing and blending said plutonium oxide and uranium oxide powder with a quantity of reactor grade uranium oxide to adjust the plutonium-uranium ratio of the fuel material composition to a desired value suitable for use in fuel elements in a nuclear reactor.

6. The process of claim 5 wherein said uranium-plutonium mole concentration of said feed solution ratio is about unity.

7. The process of claim 5 wherein said uranium and plutonium solute is in the form of uranyl-nitrate and plutonium-nitrate.

8. The process of claim 5 wherein said uranium and plutonium is precipitated by the addition of concentrated ammonium hydroxide.

References Cited by the Examiner

UNITED STATES PATENTS 2,868,707  1/1959  Alter et al. _____ 252—301.1

BENJAMIN R. PADGETT, *Primary Examiner.*

S. J. LECHERT, JR., *Assistant Examiner.*